(12) United States Patent
Lane

(10) Patent No.: US 6,279,512 B1
(45) Date of Patent: Aug. 28, 2001

(54) METHOD AND APPARATUS FOR SORTING LIVESTOCK

(76) Inventor: James Cullen Lane, 4032 Emma Cannon La., Ayden, NC (US) 28513

( * ) Notice: Subject to any disclaimer, the term of this patent is extended or adjusted under 35 U.S.C. 154(b) by 0 days.

(21) Appl. No.: 09/480,578

(22) Filed: Jan. 10, 2000

Related U.S. Application Data

(63) Continuation-in-part of application No. 09/174,618, filed on Oct. 19, 1998.
(60) Provisional application No. 60/070,783, filed on Jan. 8, 1998.

(51) Int. Cl.$^7$ .................................................. A01K 29/00
(52) U.S. Cl. ............................................................. 119/843
(58) Field of Search .................................. 119/503, 174, 119/510, 840, 843; 231/7

(56) References Cited

U.S. PATENT DOCUMENTS 1,182,018 * 5/1916 Koenig .
3,921,586 * 11/1975 Sweeney et al. .
4,006,714 * 2/1977 Goossen .
4,997,127 * 3/1991 McEwen .................................. 231/7

* cited by examiner

Primary Examiner—Thomas Price
(74) Attorney, Agent, or Firm—Mills Law Firm PLLC

(57) ABSTRACT

A method and apparatus for sorting livestock such as hogs, sheep, cows, and poultry within an enclosure and guiding the livestock to an exit opening therein is disclosed. The present invention includes an elongated, foldable livestock barrier constructed of a durable plastic material which may be attached to a perimeter wall of a livestock enclosure adjacent an exit opening therein and gradually unfolded and extended to a remote position along an opposite wall of the enclosure to separate the livestock into groups to be sorted. Thereafter, the flexible barrier is gradually refolded to shorten its effective length and moved along the perimeter wall toward the exit opening of the enclosure to gradually reduce the confined area wherein the animals to be sorted are contained. Using this technique the animals are guided out of the exit opening to an alternate floor within the livestock facility without injury to either the animal or the worker. The livestock barrier is adaptable to various types of animal enclosures and is versatile in its application and use.

4 Claims, 5 Drawing Sheets

METHOD AND APPARATUS FOR SORTING LIVESTOCK

CROSS REFERENCE TO RELATED APPLICATION

This Application is a continuation-in-part of Ser. No. 09/174,618 pending, filed on Oct. 19, 1998 which claims the benefit under 35 U.S.C. 119(e) of United States Provisional Application No. 60/070,783 filed Jan. 8, 1998 by James C. Lane for Method of Sorting Livestock.

BACKGROUND OF INVENTION

1. Field of Invention

The present invention relates generally to animal husbandry and, more particularly, to a method and apparatus for sorting livestock animals.

At various stages in their life cycle and development, livestock animals such as pigs, cattle, sheep, and poultry are housed in discrete locations for feeding, breeding, processing and transport.

In the hog industry, for example, newborn piglets may initially be contained in a gestation area and thereafter routed to a nursery area for further development. At a later stage, certain hogs may be culled from the population based on specific characteristics and routed to other processing areas. Eventually, the mature hogs will be routed for loading onto transportation vehicles.

The relocation of livestock animals causes numerous problems for the animals as well as for the industry workers. Livestock animals under such conditions are stressed by many factors including changes in their environment, feed, and weather conditions. However, stress involved in physically relocating the livestock animals is regarded as the most detrimental. Moreover, the physical exertion, fatigue, and frustration associated with relocating livestock makes it one of the least desirable tasks for workers in the industry.

Traditionally, in the hog industry the worker has utilized a handheld barrier or panel to herd the animals in the desired direction and block their movement to an unwanted area. Such handheld barriers were often made of iron or steel and were extremely heavy and inconvenient for this purpose. Because pigs are resistive and become agitated and stressed in response to this forced movement, they tend to avoid the handheld barriers and the process becomes tedious and frustrating. Moreover, this blocking technique must be directed at only one animal at a time.

Under these conditions the animal often impacts the barrier causing in injury to both the animal and the worker resulting in obvious economic losses.

Thus, the present invention has been developed to provide a method and apparatus for solving these problems and other shortcomings of the prior art.

DESCRIPTION OF RELATED PRIOR ART

U.S. Pat. No. 2,835,223 to L. A. Erickson discloses an enclosure assembly for livestock wherein a plurality of hingedly interconnected, chain linked panels are adapted for adjustable connection with a permanently installed fence frame to permit the temporary setup of an animal enclosure of a desired configuration.

U.S. Pat. No. 4,136,641 to Herbert F. Hoffinan discloses a livestock sorting gate having a chute forming a path for guiding animals toward a pair of pens disposed in opposite relation to another laterally of the path for receiving animals being guided down the chute.

U.S. Pat. No. 4,552,096 to William J. Forrest discloses a sorting gate assembly adapted for use in cooperation with a holding pen including a sorting and a gate support assembly. The sorting gate is moveably supported on the gate support assembly for movement within the holding pen to sort a selective animal and to move the sorted animal to an exit area portion of the holding pen.

U.S. Pat. No. 5,372,092 to Wayne N. Pederson discloses a cow and calf catcher and hauler assembly including an outer catcher pen, an inner platform and a cow chute and a calf pen. The outer catcher pen has a pair of opposite side walls and an end wall extending between and connected at opposite ends to the side walls for defining an openable and closeable enclosed area. One of the side walls of the outer side wall catcher pen is pivotally connected to one end of the end walls so as to function as an outside swingable gate adapted to undergo swinging movement between open and closed positions relative to the other of the opposite side walls thereof.

U.S. Pat. No. 4,275,685 to Donald L. Hopkins discloses an apparatus for the handling of sheep which includes a circular pen having two barricades each radially aligned within the pen and being supported and aligned relative to an inlet and an outlet and with drive means connected to one of the movable barricades so that sheep can be urged through an outlet while another portion of the pen behind the moving barricade can be filled with sheep.

U.S. Pat. No. 1,381,797 to Herman D. Caspers discloses a stock separator for separating hogs of different sizes and ages. This invention includes a rectangular frame wherein a pair of opposed doors including pivoting rollers are mounted. The rollers are adjustable to permit hogs of certain sizes only to pass through a gate to obtain access to feed troughs.

U.S. Pat. No. 2,050,527 to Christian Grabe discloses an animal chute for separating animals having a given characteristic from a common flock. This invention includes a portable fence having a plurality of hinged sections which is attached at one end thereof to a lane construction wherethrough animals such as a flock of sheep are driven. The portable fence is swingable between the walls defining the lane to divert specific animals such as lambs to a separate enclosure for processing.

U.S. Pat. No. 3,072,099 to Glenn M. Stevens discloses a so-called cutting gate for sheep, hogs and the like which may be used to block off animals in a chute and which will accommodate chutes of different widths.

SUMMARY OF THE INVENTION

After much study of the above described problems, the present invention has been developed to provide a method and apparatus for sorting livestock within an enclosure and moving the sorted animals to an exit area portion of the enclosure. As shown in the accompanying drawings, the present invention includes an elongated, flexible barrier which is removeably attached at one end thereof adjacent the exit opening in a perimeter wall enclosure. Initially, the barrier is folded or rolled up for convenient handling being gripped at the upper portions thereof by a worker. After being attached adjacent the exit area by suitable attaching hardware the barrier is unfolded as the worker moves to a remote position within the enclosure so as to separate and sort the animals within the confines of the barrier and the exit containing wall.

After the animals are separated, the worker moves the barrier along the perimeter wall and refolds the barrier as its effective length is shortened thereby decreasing the enclosed the area and moving the animals toward the exit.

Once the animals have exited the enclosure, the barrier is completely refolded for storage or it may be conveniently transported to other locations for reuse.

In view of the above, it is an object of the present invention to provide a method and apparatus for sorting and moving livestock animals within an enclosure to an exit portion of the enclosure.

Another object of the present invention is to provide a lightweight, flexible barrier which may be deployed by a single worker to sort animals within an enclosure and which is foldable as the barrier is moved about the enclosed area reducing its effective length and the confined area of the enclosure within the barrier.

Another object of the present invention is to provide a flexible barrier for use within a livestock enclosure to which the animals are not resistive resulting in reduced agitation and stress to the animals.

Another object of the present invention is to provide a flexible barrier for use in sorting animals within a livestock enclosure that will not cause physical injury to the animals upon contact therewith.

Other objects and advantages of the present invention will become apparent and obvious from a study of the following description and the accompanying drawings which are merely illustrative of such invention.

DETAILED DESCRIPTION OF THE PREFERRED EMBODIMENT

Figure 1:
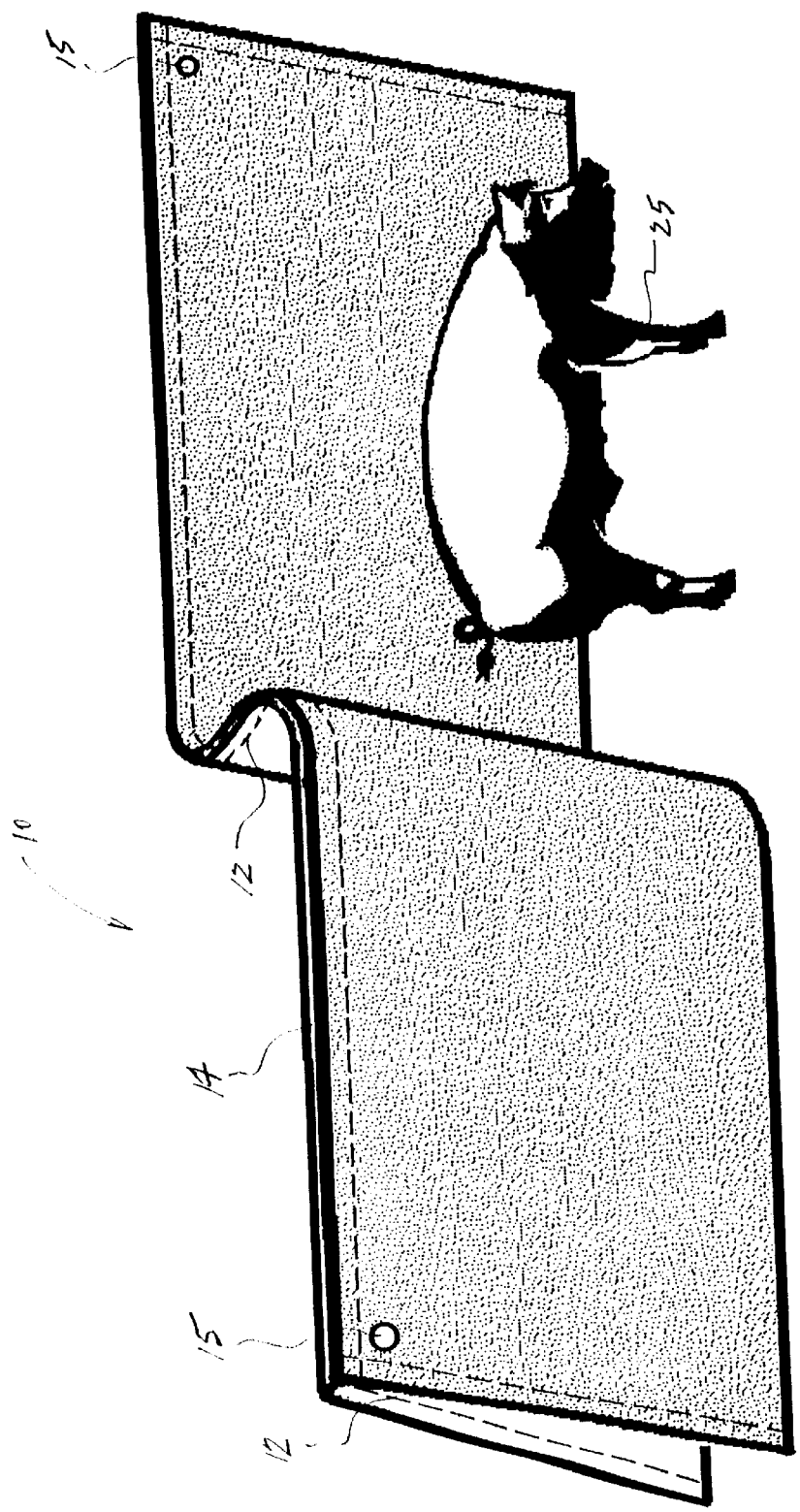
FIG. 1 is a perspective view of the barrier apparatus of the present invention shown in a deployed condition.

With further reference to the drawings there is shown therein a livestock barrier apparatus in accordance with the present invention, illustrated in FIG. 1 and indicated generally at 10. In the preferred embodiment the barrier 10 is constructed of a lightweight flexible plastic sheet material such as polypropylene, polyethylene or other suitable plastic material having a thickness of approximately 10 to 20 mils.

The barrier 10 may include a fibrous webbing material such as nylon or canvass which is imbedded in the plastic sheet material to provide reinforcement and to enhance the resistance of the barrier to tearing.

In the preferred embodiment the barrier 10 is rectangular in configuration ranging from approximately 10 to 40 feet or more in length depending upon the application. For example, for use in sorting hogs, the optimum length has been determined to be approximately 30 to 40 feet for use in a variety of sorting operations.

The height of the barrier 10 for use in hog raising facilities has been determined to be in the range between 36 to 42 inches. It is thought that this height range is perceived by the animals as being an impenetrable barrier in comparison to a lesser height which may be disregarded by the animals.

The material utilized in constructing the barrier 10 should also be translucent to opaque in character. In the preferred embodiment, an opacity of at least 50% or more is sufficient with 80% or more being preferred. This is in contrast to clear or mesh materials that would allow for determination of shapes or objects by the livestock therethrough and could be perceived as a lesser obstruction.

The barrier material should also have characteristics of being drapable with sufficient flexibility and width to hang vertically without significant wrinkling and to be foldable into vertical panels. The barrier material should also be washable, non-shrinking, and non-brittle all of which are advantageous in the animal husbandry environment.

During the construction of the barrier 10 the cut edges thereof may be hemmed along the stitch lines 12 to provide reinforcement and to resist tearing and wrinkling.

A longitudinal seam as at 14 may be formed along, the longitudinal center line of the barrier 10 or, in the alternative, a machined crease (not shown) in lieu of seam 14 may be formed during manufacturing to facilitate folding of the barrier 10 180° onto itself to achieve the configuration shown in FIG. 1. In this configuration it will be appreciated that the barrier 10 is free standing to a limited extent which will assist the worker in deploying it within the animal enclosure.

In the embodiment of the present invention shown in FIG. 6, the folded barrier 10 has two short stiffeners 34 sewn into the seam 14 adjacent the ends of such barrier. A center stiffener 35 is provided that extends in the seam 14 between the inner ends of stiffener 34 with a space between the end and center stiffener that acts as a hinge to allow folding as clearly seen in FIG. 7.

The advantage of these stiffeners sewn into the upper vertical seam 14 of the barrier 10 is that the barrier will not tend to sag during use. The barrier can also be used with one or both of the end stiffeners 34 folded as shown in FIG. 7.

Another advantage of a plurality of stiffeners is that they can be folded over as shown in FIG. 7 and then rolled for compact transport and storage. It can also be readily deployed by simply unrolling or unfolding it and the barrier is ready to use.

Standard grommet fittings 15 of a predetermined size are installed in the end portions of the barrier 10 to secure it by suitable attaching hardware to a perimeter wall of a livestock enclosure. Such attaching hardware may take many forms depending upon the construction of the enclosure. For example, a U-shaped hook bracket (not shown) which can engage the grommet 15 to support one end of barrier 10 has proven adequate for this purpose. However, it will be appreciated by those skilled in the art that numerous forms of attaching hardware will function adequately for this purpose.

Since such attaching hardware is well known to those skilled in the art, further detailed discussion of the same is not deemed necessary.

Figure 2:
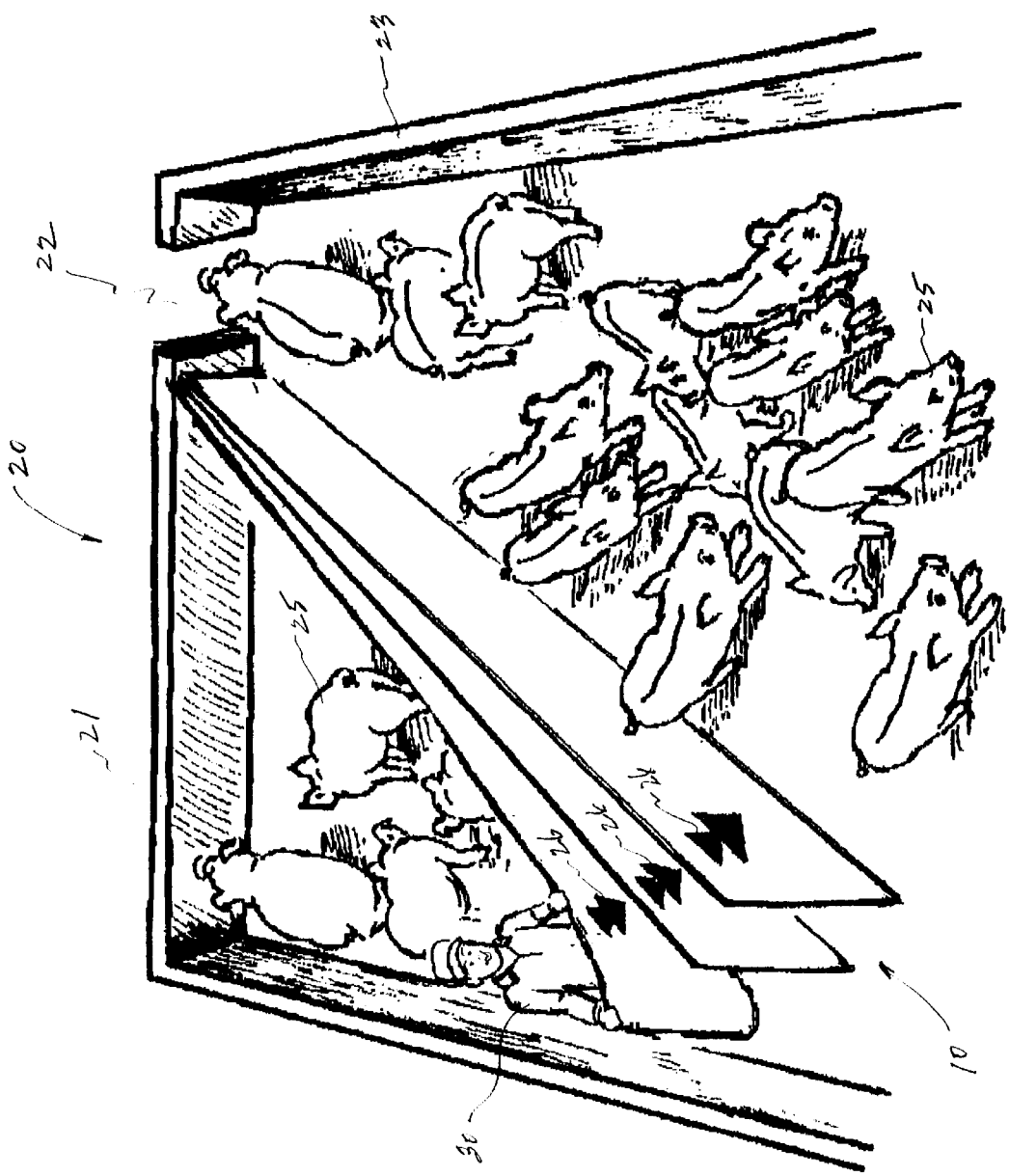
FIG. 2 is a perspective view showing the barrier apparatus deployed within a hog enclosure.

Referring now to FIG. 2 there is shown therein a view of the barrier 10 installed in its functional position within an animal enclosure, indicated generally at 20, wherein a plurality of hogs 25 are contained. It can be seen that the enclosure 20 includes an exit opening 22.

In FIG. 2 the barrier 10 has been attached to the side wall 21 of the enclosure adjacent the exit opening 22 as described hereinabove. A worker 30 has extended the barrier 10 to an unfolded condition at a position remote from the exit opening 22 so as to separate the hogs 25 into two groups with the animals to be sorted confined between the barrier 10 and the side walls 23 and 21 forming the exit opening.

In practical use, the worker 30 advances the barrier 10 by grasping the upper edge adjacent the seam 14 and walking toward the side wall 23 as indicated by directional arrows 26.

Once the barrier 10 has been brought into contact with the side wall opposite the exit opening 22, the worker 30 will begin to fold the barrier 10 to effectively shorten its length and walk along the wall 23 toward the exit opening 22 thereby decreasing the enclosed area and moving the hogs 25 toward the exit.

The folding and movement of the barrier 10 is continued until all the hogs 25 have left the enclosure and, thereafter, the barrier 10 is completely refolded for further use or storage.

Figure 3:
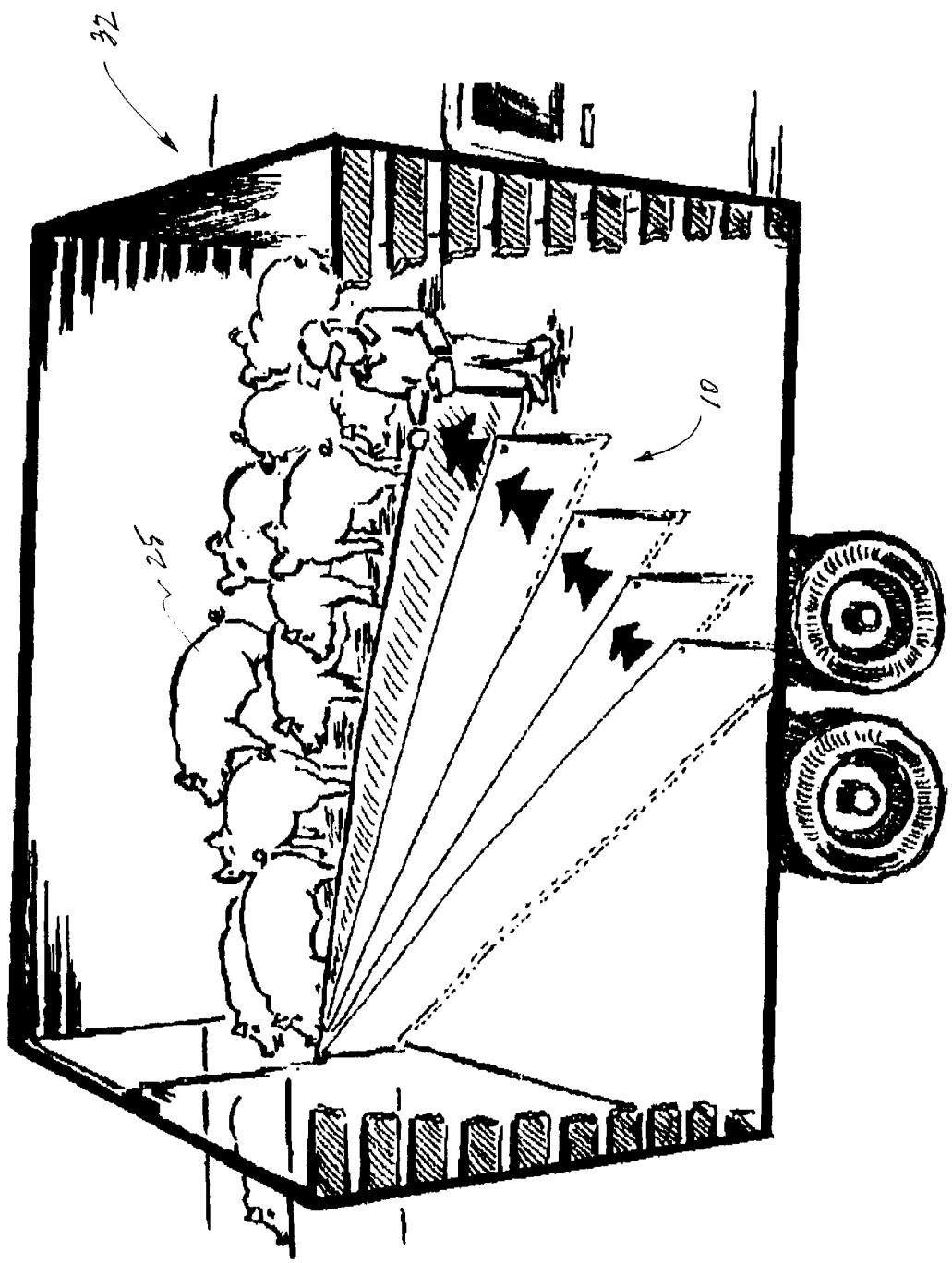
FIG. 3 is a perspective view of the barrier apparatus deployed in the cargo area of a transport vehicle.

Using a similar technique to that disclosed hereinabove in reference to FIG. 2 a worker may utilize the barrier 10 to unload hogs 25 from a transport vehicle, indicated generally at 32 as illustrated in FIG. 3.

Figure 4:
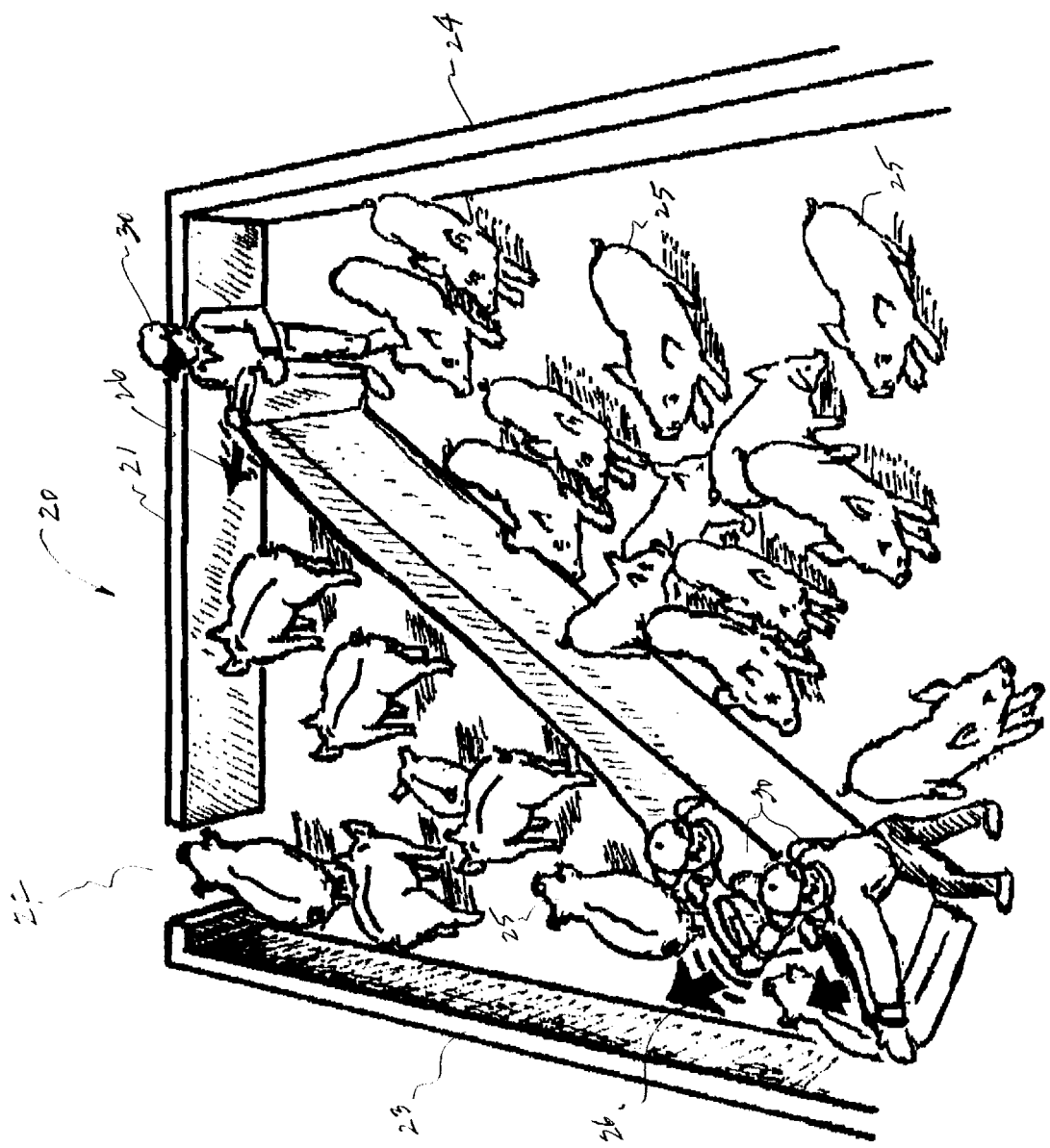
FIG. 4 is a perspective view showing the barrier apparatus deployed in a hog enclosure and being folded to reduce the length thereof.

Referring now to FIG. 4 an alternative method of deploying the barrier 10 is illustrated. Using this technique two workers 30 positioned at either end of the barrier 10 begin to unfold it and walk to opposite sides of the enclosure 20 to separate and sort the hogs 25.

Once the workers 30 have unfolded a sufficient length of the barrier 10 to reach their positions against adjacent side walls 21 and 23, each worker then begins to walk toward the exit opening 22 as indicated by directional arrows 26 refolding the barrier 10 as its effective length is shortened thereby decreasing the enclosed area and moving the hogs 25 toward the exit.

Figure 5:
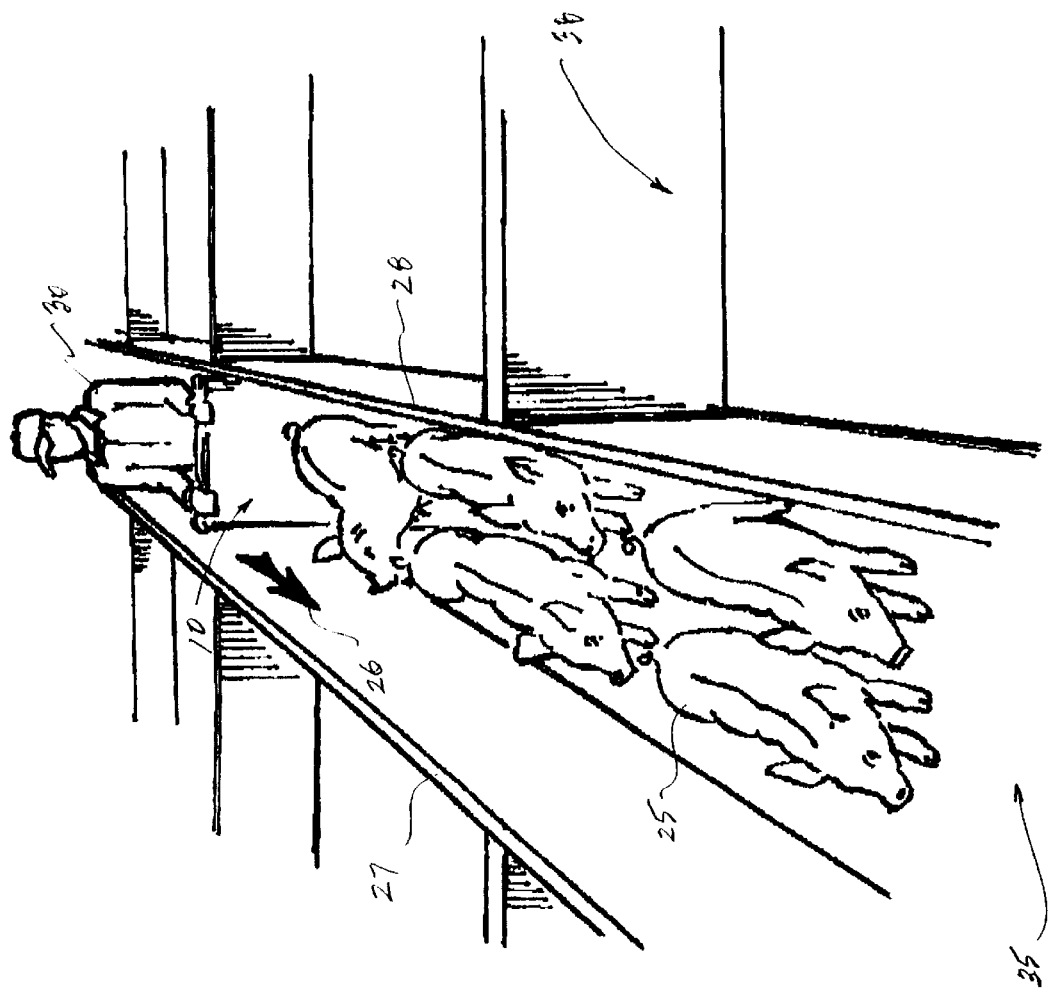
FIG. 5 is a perspective view of the barrier apparatus in a folded condition and being used to guide animals within an aisle between holding pens.

In yet another alternative method of use, the barrier 10 in its completely folded condition may be used to route the sorted hogs 25 along an aisle defined by vertical walls 27 and 28 as shown in FIG. 5. Using this technique the worker 30 extends the folded barrier 10 transversely between the walls 27 and 28 and guides the hogs 25 down the aisle, indicated generally at 35, as shown by directional arrow 26 to a holding pen, indicated generally at 38.

From the above it can be seen that the present invention provides an apparatus and various methods for sorting and transferring livestock such as hogs to various floors within the livestock facility.

The present invention provides a flexible barrier of a predetermined size which can be unfolded by a livestock worker to separate animals to be sorted and to guide them to an exit opening on a wall of the enclosure by gradually refolding the barrier and decreasing the enclosed area until the hogs exit the enclosure.

The present barrier apparatus is portable and can be adapted to use with a variety of livestock such as hogs, sheep, cows and poultry in different types of enclosures.

The terms "upper", "lower", "side" and so forth have been used herein merely for convenience to describe the present invention and its parts as oriented in the drawings. It is to be understood, however, that these terms are in no way limiting to the invention since such invention may obviously be disposed in different orientations when in use.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. The method of sorting at least one animal selected from a plurality of animals within an enclosure, said enclosure including a perimeter wall having a defined exit opening therein, comprising:

positioning an end of a flexible barrier adjacent the exit opening in the peripheral wall;

extending the barrier into the enclosure to separate at least one animal from the plurality of animals;

confining the at least one animal between the barrier and the peripheral wall containing the exit opening;

retracting the flexible barrier toward the exit opening to reduce the effective area of the enclosure until the at least one animal passes through said exit opening.

2. The method of claim 1 wherein the flexible barrier is generally rectangular in shape.

3. The method of claim 1 wherein the barrier is tethered to the peripheral wall adjacent the exit opening.

4. The method of claim 1 wherein a plurality of stiffeners provided in the upper edge of the flexible barrier which can be folded to retract the flexible barrier toward the exit opening.

\* \* \* \* \*